United States Patent
Wood et al.

(10) Patent No.: US 11,500,457 B2
(45) Date of Patent: *Nov. 15, 2022

(54) SYSTEMS AND METHODS FOR INTERFACING WITH HEAD WORN DISPLAY SYSTEMS

(71) Applicant: Rockwell Collins, Inc., Cedar Rapids, IA (US)

(72) Inventors: Robert B. Wood, Beaverton, OR (US); Eric P. Stratton, Portland, OR (US); Kenneth A. Zimmerman, Sherwood, OR (US); Gary J. Albert, Tualatin, OR (US); Robert D. Brown, Lake Oswego, OR (US); Bruce Hufnagel, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/375,903

(22) Filed: Jul. 14, 2021

(65) Prior Publication Data

US 2021/0341995 A1 Nov. 4, 2021

Related U.S. Application Data

(63) Continuation of application No. 16/510,678, filed on Jan. 12, 2019, now Pat. No. 11,099,636.

(51) Int. Cl.
*G06F 3/01* (2006.01)
*G09G 3/20* (2006.01)
*G02B 27/01* (2006.01)
*B64D 10/00* (2006.01)
*B64D 47/08* (2006.01)

(52) U.S. Cl.
CPC ............. *G06F 3/012* (2013.01); *B64D 10/00* (2013.01); *B64D 47/08* (2013.01); *G02B 27/0172* (2013.01); *G02B 27/0179* (2013.01); *G09G 3/2096* (2013.01); *G02B 2027/0138* (2013.01); *G02B 2027/0187* (2013.01); *G09G 2354/00* (2013.01); *G09G 2370/16* (2013.01); *G09G 2370/18* (2013.01); *G09G 2380/12* (2013.01)

(58) Field of Classification Search
None
See application file for complete search history.

(56) References Cited

U.S. PATENT DOCUMENTS 5,502,481 A 3/1996 Dentinger et al.
6,377,401 B1 4/2002 Bartlett
(Continued)

*Primary Examiner* — Nicholas J Lee
(74) *Attorney, Agent, or Firm* — Suiter Swantz pc llo

(57) ABSTRACT

A display system includes an interface unit, a head worn display in wireless communication with the interface unit, and a first tracker sensor remote from a head of a user and configured to wirelessly sense a head pose and provide first head tracking data to the interface unit. The interface unit is remote from the head worn display. The display system also includes a second tracker sensor associated with the head of the user and configured to provide second head tracking data associated with the head pose to the head worn display. The interface unit is configured to receive the second head tracking data from the head worn display via at least one wireless link and provide video information for display on the head worn display via the at least one wireless link.

20 Claims, 9 Drawing Sheets

(56) References Cited

U.S. PATENT DOCUMENTS

| | | |
|---|---|---|
| 2003/0063132 A1 | 4/2003 | Sauer et al. |
| 2015/0228118 A1 | 8/2015 | Eade et al. |
| 2016/0246370 A1 | 8/2016 | Osman |
| 2017/0068119 A1* | 3/2017 | Antaki .................... G06F 3/012 |
| 2018/0095529 A1 | 4/2018 | Tokubo |

* cited by examiner

FIG. 1A
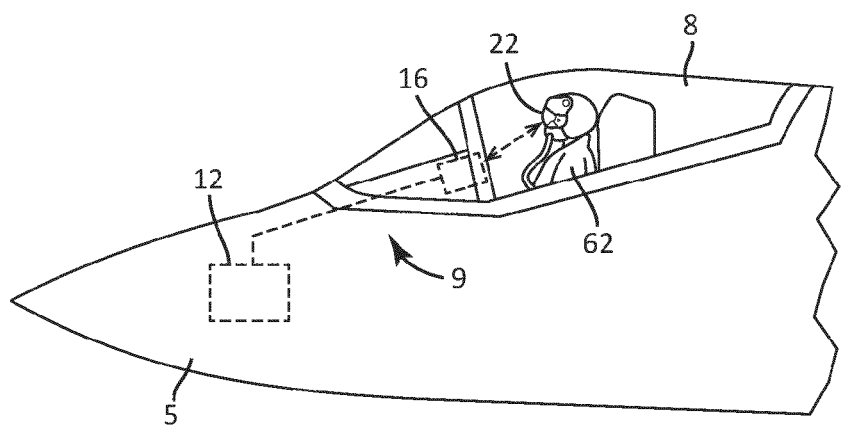
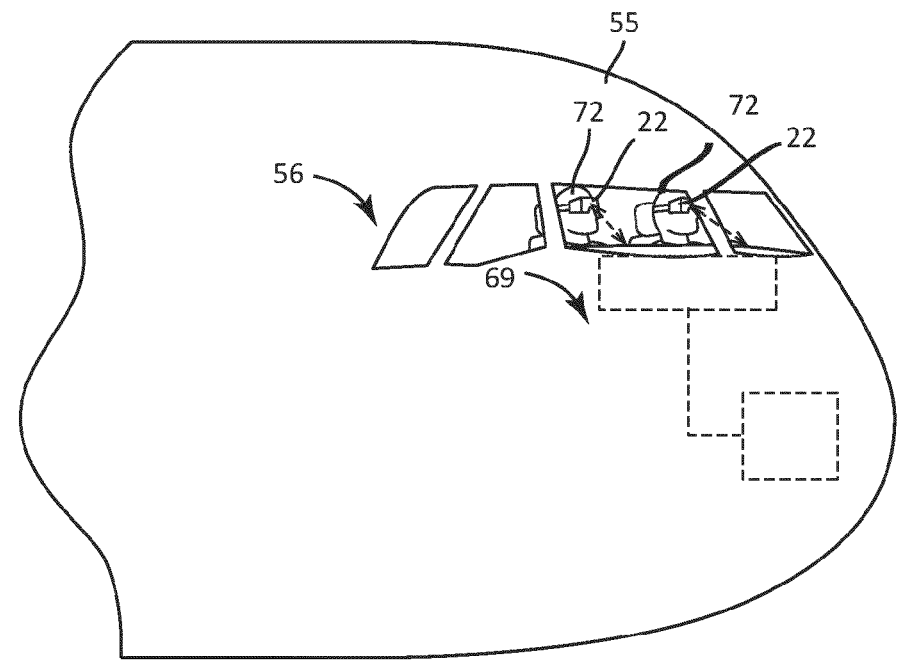
FIG. 1B

SYSTEMS AND METHODS FOR INTERFACING WITH HEAD WORN DISPLAY SYSTEMS

The present application constitutes a continuation application of and claims priority to U.S. patent application Ser. No. 16/510,678 filed on Jul. 12, 2019, entitled SYSTEMS AND METHODS FOR INTERFACING WITH HEAD WORN DISPLAY SYSTEM, which is incorporated herein by reference in its entirety.

BACKGROUND

Inventive concepts of the present disclosure relate generally to the field of head worn display (HWD) systems. More particularly, the inventive concepts of the present disclosure relate to processing and transmitting imagery for display on a HWD system (e.g., a helmet mounted display, a visor-based display, a glasses-based display, goggles-based display, etc.).

HWD systems may be used by an operator of a vehicle (e.g., a pilot of an aircraft) to display information relating to the operation of the vehicle. For example, a HWD (e.g., a display mounted to headgear worn by the pilot or otherwise worn by a pilot) may augment the pilot's view by overlaying images or symbols to help the pilot identify objects, flight conditions, or locations when looking out a windscreen of the aircraft. In some instances, imagery projected on the display may be dynamically linked to the orientation of the pilot (e.g., the pilot's head orientation or eye orientation) and conformally displayed in the pilot's view. HWD systems may receive image data (e.g., video, etc.) from circuits located onboard an aircraft, for example, from one or more sensors and/or a vision system such as an enhanced vision system ("EVS"), synthetic vision system ("SVS"), or combined vision system ("CVS"). The image data can be transmitted to and processed by a head up display (HUD) computer and rendered on the display of the HWD system with conformally depicted HUD symbols.

HWD systems in aircraft cockpits are generally tethered to fixed computer equipment (e.g., the HUD computer) in the cockpit. The computer equipment generally receives head sensor information from the headgear of the user, performs head tracking operations and generates video signals which are transmitted to the display. The tethering of the HWD system requires a cord or cable, a mechanism to locate the cord or cable on the pilot, connectors, and other hardware.

SUMMARY

In one aspect, the inventive concepts disclosed herein are directed to a display system. The display system includes an interface unit, a head worn display in wireless communication with the interface unit, and a first tracker sensor remote from a head of a user and configured to wirelessly sense a head position and provide first head tracking data to the interface unit. The interface unit is remote from the head worn display. The display system also includes a second tracker sensor associated with the head of the user and configured to provide second head tracking data associated with the head position to the head worn display. The interface unit is configured to receive the second head tracking data from the head worn display via at least one wireless link and provide video information for display on the head worn display via the at least one wireless link.

In a further aspect, the inventive concepts disclosed herein are directed to a head worn display. The head worn display includes a wireless communication interface having a light transmitter and a light receiver, and a camera head tracker configured to provide head tracking data associated with a head position. The wireless communication interface transmits the head tracking data via the light transmitter. The head worn display further includes a projector configured to project an image associated with video data received by the light receiver and a combiner configured to provide the image a user. The light transmitter is provided with a backlight assembly associated with the projector.

In a further aspect, the inventive concepts disclosed herein are directed to a method. The method includes providing first head tracking data associated with a position of a head from a head worn display to an interface unit fixed within a cockpit via a wireless interface configured to communicate light signals. The method also includes providing second head tracking data associated with the position of the head using at least one sensor remote from the head worn display and electrically coupled to the interface unit via a wired interface. The method also includes providing video data in response to the first head tracking data and the second head tracking data from the interface unit to the head worn display via the wireless interface and providing an image associated with the video data using the head worn display.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings:

FIG. 1A is a schematic illustration of an exemplary embodiment of a nose portion of an aircraft having a cockpit occupied by a single pilot using a display system according to the inventive concepts disclosed herein;

FIG. 1B is a schematic illustration of an exemplary embodiment of a nose portion of an aircraft having a cockpit occupied by a flight crew using a display system according to the inventive concepts disclosed herein.

DETAILED DESCRIPTION OF EXEMPLARY EMBODIMENTS

Figure 2:
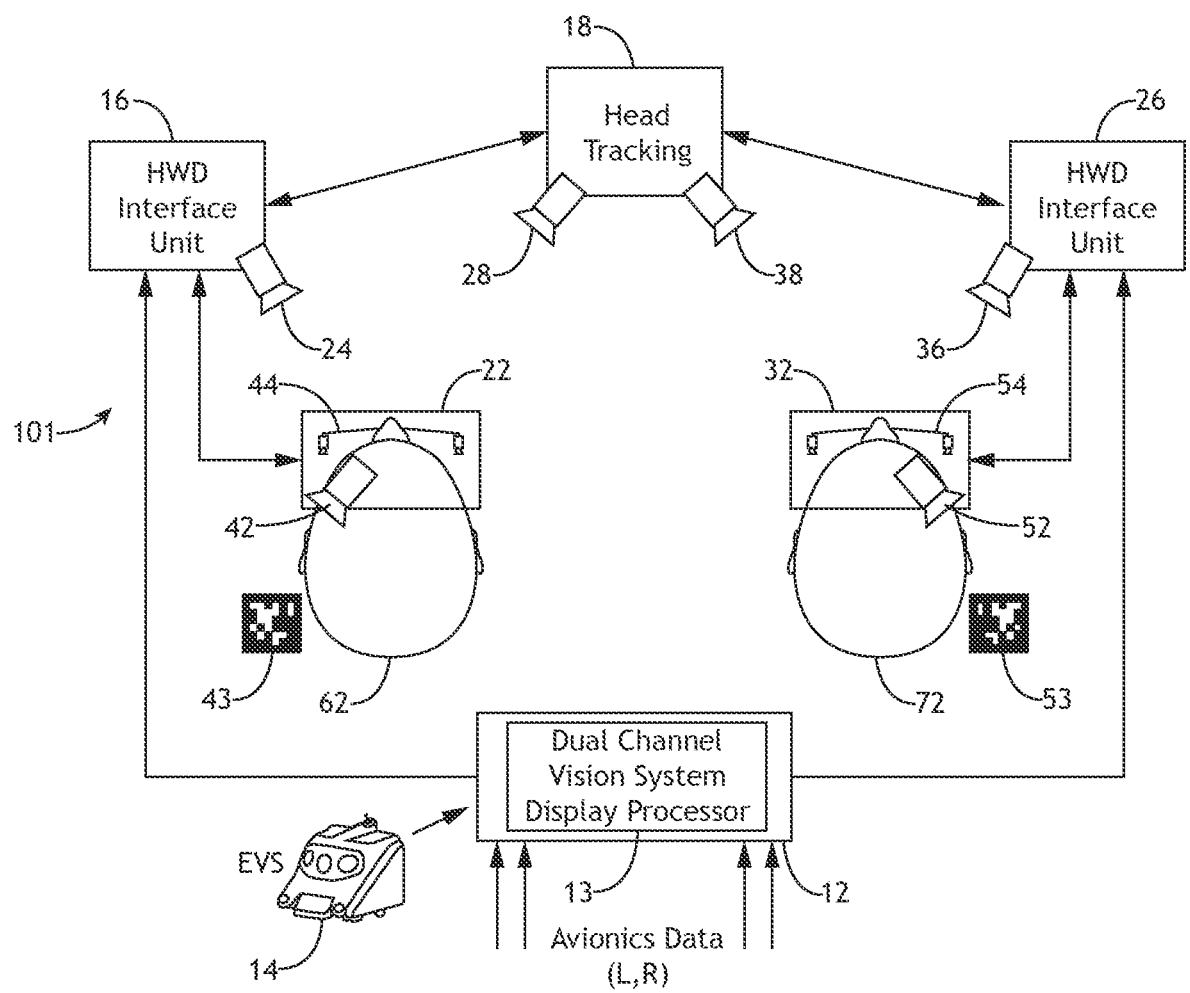
FIG. 2 is a schematic illustration of an exemplary embodiment of a display system including two head-worn displays and with a head tracking camera on each of two interface units for a pair of crew members according to certain inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly embodiments of the inventive concepts disclosed herein are directed to systems and methods for providing imagery for display on a HWD system. The inventive concepts disclosed herein can be utilized in a number of control systems for various types of applications, sensing systems, and display systems. While the present disclosure describes systems and methods implementable for a HWD for a pilot of an aircraft, the inventive concepts disclosed herein may be used in any type of environment (e.g., in another aircraft, a spacecraft, a ground-based vehicle or in a non-vehicle application such as a ground-based display system, an air traffic control system, a radar system, a medical system, a robotic system, and a virtual display system). While certain examples and embodiments of the inventive concepts disclosed herein are described with respect to a pilot of an aircraft, it will be appreciated that users other than a pilot may use and benefit from the inventive concepts disclosed herein with respect to other vehicles and/or objects.

Referring generally to the figures, systems and methods for providing imagery for display on a HWD system are shown and described according to the inventive concepts disclosed herein. The HWD is fully wireless in some embodiments. Video data to be displayed to the pilot is provided to the HWD via a WiFi or LiFi interface. The video data is encoded into a WiFi or LiFi signal in an interface unit and is transmitted to the HWD. The video data is provided by one or more sensors and/or one or more vision systems (e.g., an EVS, SVS, or CVS). The input may relate to actual or generated imagery to be displayed on the HWD. The WiFi or LiFi signal is used to charge a battery or capacitor in the HWD in some embodiments, thus expanding the time the worn display unit can be used between charges.

In some embodiments, the HWD system or method uses an information processing system embodied as a federated HWD computer or an HWD information processing system integrated into a display cabinet architecture. The output of the display cabinet or federated HWD computer is provided to an interface unit which receives the pre-formatted video data from the display cabinet or the federated HWD computer via computer interfaces (ethernet, fiber optic, ARINC, etc.). The interface unit converts the fiber-optic or electronic computer interface signal to a LiFi or WiFi signal for reception by the HWD in some embodiments. In some embodiments, the interface unit provides light emitting diode (LED) power control.

The interface unit also contains one or more cameras which provide part of a high integrity outside in head tracking operation. In some embodiments, each side of the cockpit has an interface unit, one for each pilot's HWD. In some embodiments, one of two cameras in the interface unit views the pilot's HWD which contains a fixed pattern of infrared or other LEDs or passive markers (e.g., Aruco codes) used for head tracking, while the other camera looks across the cockpit to view the other pilot's HWD. Thus, each HWD is viewed by two independent cameras as part of the head tracking architecture in some embodiments. Advantageously, the architecture eliminates the need to tether the HWD to the flight deck and minimizes the equipment installation for dual HWDs while maintaining a high integrity head tracking architecture in some embodiments. In some embodiments, the outside in head tracking approach advantageously enables a lower integrity, less expensive HWD to be utilized.

With reference to FIG. 1A, a schematic illustration of a nose portion of an aircraft 5 having a cockpit 8 occupied by a pilot 62 includes a display system 9. The display system 9 includes a cabinet unit 12, an interface unit 16 and a head worn display 22 configured to be worn by the pilot 62 in some embodiments. The aircraft 5 can be any type of vehicle, including but not limited to: a transport aircraft, a simulator, a military aircraft, a helicopter, a ground vehicle, etc.).

The pilot 62 uses the head worn display 22 to receive and view information related to the operation of the aircraft 5. The head worn display 22 receives the information from an interface unit 16 located remotely from the head worn display 22. The interface unit 16 is a computer system (e.g., a line replaceable unit) located within the aircraft 5 and configured to receive an input from one or more sensors or vision systems of the aircraft 5 via a cabinet unit 12. In some embodiments, the interface unit 16 is an image delivery system that processes inputs related to head pose, aircraft pose, and video data and wirelessly provides the head worn display 22 with a display signal for imagery (e.g., images, video, symbols, and other display information or features) as described below.

The head worn display 22 may be configured to provide imagery in any type of format. The head worn display 22 may be configured to provide two-dimensional or three-dimensional imagery. The type of display, combiner, projector and image source used with the head worn display 22 can be any type of electronic/optical system for providing images such as conformal images. The head worn display 22 receives image data processed by an image processing circuit in the interface unit 16 or the cabinet unit 12 located remote from the head worn display 22. For example, a dual channel vision systems display processor in the cabinet unit 12 receives inputs from the sensors and vision systems of the aircraft 5. In some embodiments, the dual channel vision systems display processor in the cabinet unit 12 processes the inputs before communicating processed images to the head worn display 22. In some embodiments, the head worn display 22 requires fewer components to display images when image inputs are processed remote from the head worn display 22 (e.g., in the cabinet unit 12 and the interface unit 16) and are delivered to the head worn display 22 when compared to a system that processes the image inputs with equipment on the head worn display 22 itself. Such arrangements advantageously minimize hardware components required by the head worn display 22 and may further reduce the electric power and computational power needed to operate the head worn display 22 in some embodiments. In some embodiments, the head worn display 22 may be configured to receive imagery from the interface unit 16 and to render the imagery on the head worn display 22 without further processing the imagery, while in other embodiments the head worn display 22 is configured to further process the received imagery before the imagery is displayed.

With reference to FIG. 1B, a nose portion of an aircraft 55 includes a cockpit 56 occupied by a flight crew 72. The cockpit 56 of the aircraft 55 includes a display system 69. The display system 69 is similar to the display system 9 discussed with the reference to FIG. 1A and includes head worn displays 22.

With reference to FIG. 2, a display system 101 can be utilized as the display systems 9 and 69 in FIGS. 1A-B for providing an image to the head worn display 22 and a head worn display 32. The display system 101 may be configured to combine the various inputs from the various systems to generate imagery representing an actual view, a synthetic view, or a combination view. The display system 101 includes the cabinet unit 12 including a dual channel processor 13 (e.g., including an HDD frame module), the interface unit 16, a head tracking unit 18, an interface unit 26, the head worn display 22 and the head worn display 32 in some embodiments. The display system 101 is configured for use by two or more pilots 62 and 72 in a side by side configuration in some embodiments. The dual channel processor 13 receives avionic data and provides video output for a left and right channel in some embodiments. The architecture of display system 101 minimizes the number of required cockpit LRUs, provides cross cockpit monitoring to meet the integrity requirements of head worn displays 22 and 32, and reduces the functionality of the head worn displays 22 and 32, thus, reducing weight and power requirements.

The cabinet unit 12 is coupled to an enhanced vision system 14, a synthetic vision system, combinations thereof, and/or aircraft sensors via a bus or network wired connection in some embodiments. The cabinet unit 12 is also coupled to the interface units 16 and 26 via a bus, a fiber optic cable, or network wired connection in some embodiments. The enhanced vision system 14 can provide video data referenced to or in alignment with the boresight of the aircraft 5 (FIG. 1). The cabinet unit 12 includes a data link receiver or data bus for receiving information from one or more of flight management computers and other avionic equipment that provide flight parameters or sensor data.

According to some embodiments, the synthetic vision system 14 can be any electronic system or device for providing a computer generated image of the external scene topography. The image can be from the perspective of the aircraft flight deck as derived from aircraft attitude, high-precision navigation solutions, and a database of terrain, obstacles and relevant geometric features. According to some embodiments, the system 14 can be any electronic system or device for providing a sensed or simulated image of the external scene topography. The system 14 can be an infrared, visual camera, or combination thereof in some embodiments.

The head tracking unit 18 is coupled to the interface units 16 and 26 via a bus, fiber optic, or network wired connection in some embodiments. The interface units 16 and 26 are in communication with the head worn displays 22 and 32 via WiFi or LiFi connections or links in some embodiments. The interface unit 16 includes a camera 24 configured to provide an outside in view of the head worn display 22 or the pilot 62 to provide head tracking data in response to sensor data such as image data or other data from the camera 24. The interface unit 26 includes a camera 36 configured to provide an outside in view of the head worn display 32 or the pilot 72 to provide head tracking data in response to sensor data such as image data or other data form the camera 24. The interface units 16 and 26 are computer units configured to process the video data from the cabinet unit 12 and the head tracking data to provide conformal imagery on the head worn displays 22 and 32.

The head tracking unit 18 includes a camera 28 configured to provide an outside in view of the head worn display 22 for the pilot 62 for head tracking. The head tracking unit 18 includes a camera 38 configured to provide an outside in view of the head worn display 32 for the pilot 72 for head tracking. The head tracking unit 18 is computer unit configured to provide head tracking data associated with the cameras 28 and 38 to the interface units 16 and 26. The camera 28 provides a cross cockpit view of the pilot 62 or head worn display 22, and the camera 38 provides a cross cockpit view of the pilot 72 or head worn display 32. The head tracking data associated with the cameras 28 and 38 is provided to the respective units 16 and 26 via a wired connection in some embodiments. The cameras 24 and 28 provide data for a primary head tracking operation for the pilot 62, and the cameras 36 and 38 provide data for a primary head tracking operation for the pilot 72.

The head worn display 22 includes a camera 42 and a combiner 44, and the head worn display 32 includes a camera 52 and a combiner 54 in some embodiments. Head tracking data from the camera 42 is provided to the interface unit 16 via a wireless communication link in some embodiments. Head tracking data from the camera 52 is provided to the interface unit 26 via a wireless communication link in some embodiments. The head worn displays 22 and 32 are configured to provide respective head tracking data using respective markers 43 and 53 fixed in a known location. The head pose is determined from the respective images of the markers 43 and 53 captured by the cameras 42 and 52. The markers 43 and 53 can be a continuous marking in a circumference about the pilots 62 and 64 (e.g., on the ceiling) or include a pattern of markings at fixed locations in the cockpits 8 and 56 (FIGS. 1A-B). The head mounted view of cameras 42 and 52 provides data for additional integrity in the head tracking operation (e.g., for monitoring). The head worn displays 22 and 32 include a fixed pattern (of infrared or other LEDs or passive markers) that are captured by the cameras 24, 28, 38, and 36 for head tracking in some embodiments.

The interface unit 16 processes the head tracking data from the cameras 24, 28, and 42 to determine the pose (e.g., head position (x, y, z) and orientation (yaw, pitch, and roll)) of the pilot 62 and uses the head pose for the provision of an image conformally on the combiner 44. The interface unit 26 processes the head tracking data from the cameras 36, 38, and 52 to determine the head pose of the pilot 72 and uses the pose for the provision of an image conformally on the combiner 54. The interface units 16 and 26 and/or the head tracking unit 18 can calculate the head pose for both pilots 62 and 72 to provide a redundant calculation of head pose for integrity checks and in case of a subsystem failure. The head tracking operations can also determine a current gaze of the pilots 62 and 72. The gaze of the pilot 62 may be based on a combination of the eye and head pose. For example, the cameras 24, 28 and 78 may include an eye tracking system configured to determine the orientation of the eyes of the pilot 72. The interface unit 16 is configured to update the imagery shown on the head worn display 22 based on the pilot's gaze.

The interface units 16 and 26 and the head worn displays 22 and 32 include hardware components, components executing software (e.g., a processor), and/or combinations thereof configured to provide the imagery as described herein in some embodiments. The imagery provided on the combiners 44 and 54 includes one or more of conformal HUD symbols, conformal vision system video, conformal synthetic images, and flight information. The imagery is configured for view by each pilot 62 and 72. The interface units 16 and 26 and the head worn displays 22 and 32 can include frame memories or other storage devices for the imagery in some embodiments. The interface units 16 and 26 and the head tracking unit 18 can be part of or integrated with other avionic systems and each other in some embodiments. In some embodiments, the interface units 16 and 26 and the head tracking unit 18 are independent platforms.

Figure 3:
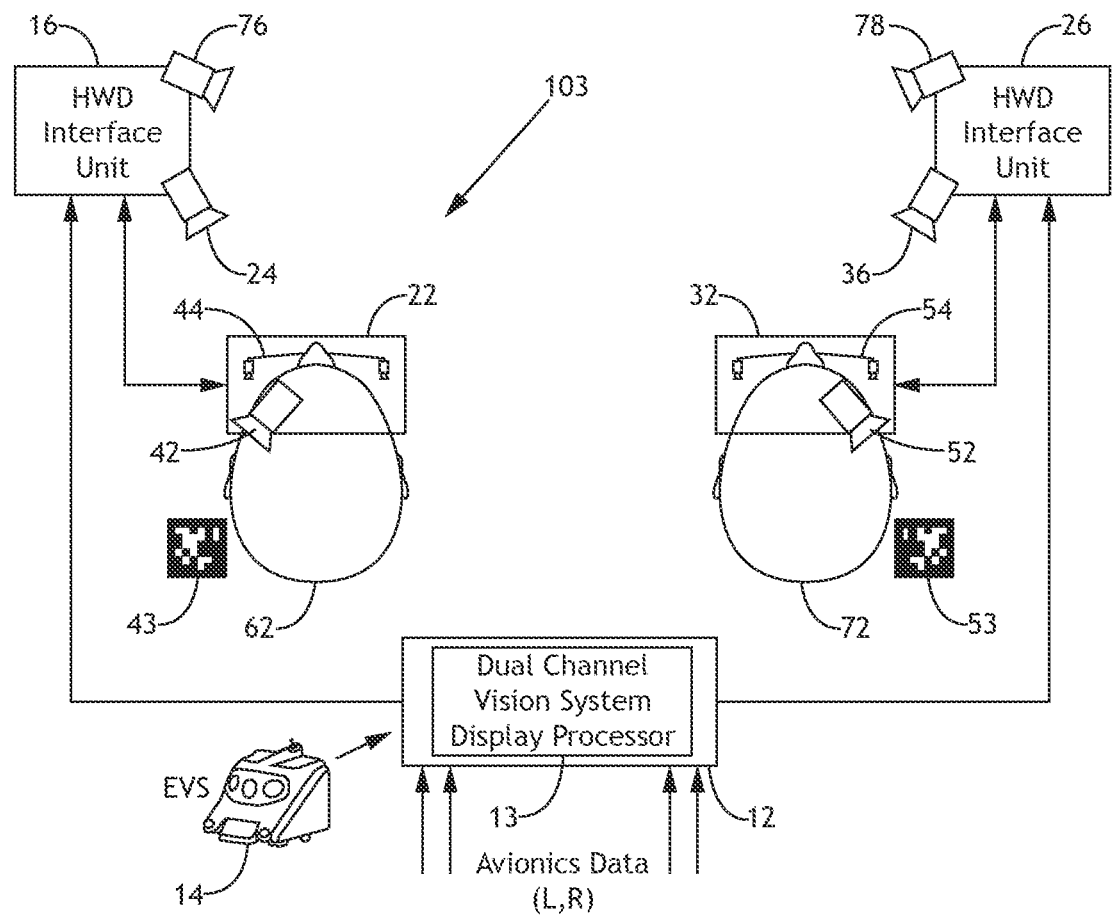
FIG. 3 is a schematic illustration of an exemplary embodiment of a display system including two head-worn displays and with two head tracking camera on each of two interface units for a pair of crew members according to certain inventive concepts disclosed herein.

With reference to FIG. 3, a display system 103 is similar to the display system 101 and can be utilized as the display system 9 or 69 in FIGS. 1A-B for providing an image to the head worn display 22 and the head worn display 32. The display system 103 includes the cabinet unit 12, the interface unit 16, the interface unit 26, the head worn display 22 and the head worn display 32 in some embodiments. The display system 103 is configured for use by two or more pilots 62 and 72 in a side by side configuration and does not include a separate head tracking unit in some embodiments.

The cabinet unit 12 is coupled to an enhanced vision system 14, a synthetic vision system, combinations thereof, and/or aircraft sensors via a bus or network wired connection in some embodiments. The cabinet unit 12 is also coupled to the interface units 16 and 26 via a bus, a fiber optic cable, or network wired connection in some embodiments.

The interface units 16 and 26 are in communication with the head worn displays 22 and 32 via WiFi or LiFi connections in some embodiments. The interface unit 16 includes the camera 24 configured to provide an outside in view of the head worn display 22 or the pilot 62 and is configured to provide head tracking data for the pilot 62 in response to data associated with the view. The interface unit 16 also includes a camera 76 configured to provide an outside in view of the head worn display 32 or the pilot 72 across the cockpit and is configured to provide head tracking data for the pilot 72 in response to data associated with the view. The interface unit 26 includes the camera 36 configured to provide an outside in view of the head worn display 32 or the pilot 72 and is configured to provide head tracking data for the pilot 72 in response to data associated with the view. The interface unit 26 also includes a camera 78 configured to provide an outside in view of the head worn display 22 or the pilot 62 across the cockpit and is configured to provide head tracking data for the pilot 62 in response to data associated with the view. The cameras 24 and 28 provide a primary head tracker for the pilot 62, and the cameras 36 and 38 provide a primary head tracker for the pilot 72.

The head tracking data associated with the camera 78 is provided to the interface unit 16, and the head tracking data associated with the camera 76 is provided to the interface unit 26. The interface unit 16 processes the head tracking data from the cameras 24, 78, and 42 to determine the head pose (e.g., yaw, pitch, and roll) of the pilot 62 and uses the head pose for the provision of an image conformally on the combiner 44. The interface unit 26 processes the head tracking data from the cameras 36, 76, and 52 to determine the head pose (e.g., yaw, pitch, and roll) of the pilot 72 and uses the head pose for the provision of an image conformally on the combiner 54. The interface units 16 and 26 can each receive all of the head tracking data and calculate the head pose for both pilots 62 and 72 to provide a redundant calculation of head pose for integrity checks and in case of a subsystem failure. In some embodiments, the interface units 16 and 26 provide the redundant calculations using only the data from the cameras 24, 36, 76 and 78 (without the data from the cameras 42 and 32).

Figure 4:
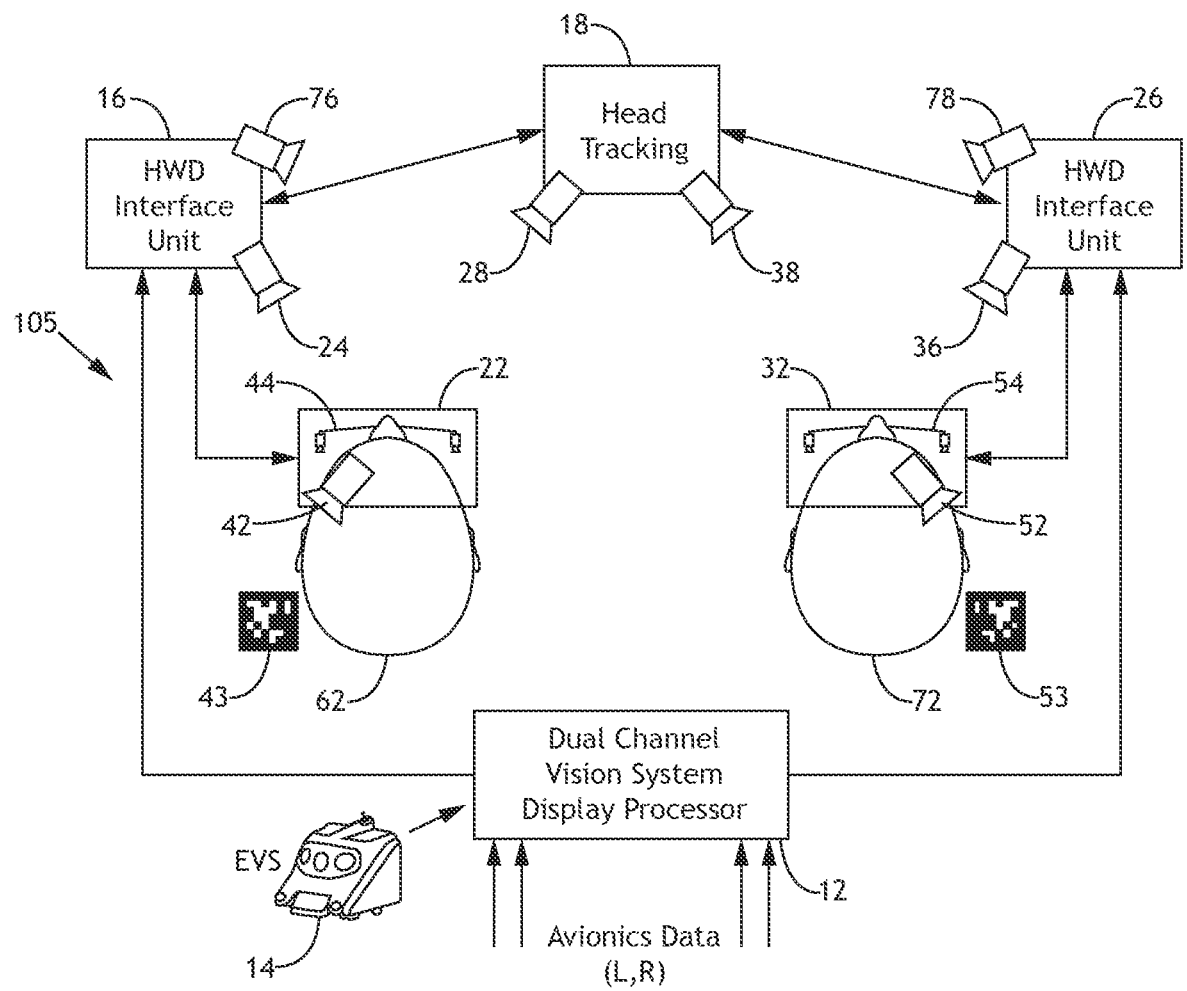
FIG. 4 is a schematic illustration of an exemplary embodiment of a display system including two head-worn displays and eight head tracking cameras for a pair of crew members according to certain inventive concepts disclosed herein.

With reference to FIG. 4, a display system 105 is similar to the display system 101 and can be utilized as the display system 9 and 69 in FIGS. 1A-B for providing an image to the head worn display 22 and the head worn display 32. The display system 105 includes the cabinet unit 12, the interface unit 16, the head tracking unit 18, the interface unit 26, the head worn display 22 and the head worn display 32 in some embodiments.

The head tracking unit 18 is coupled to the interface units 16 and 26 via a bus, fiber optic, or network wired connection in some embodiments. The head tracking unit 18 includes the camera 28 configured to provide an outside in view of the head worn display 22 for the pilot 62 for head tracking. The head tracking unit 18 includes the camera 38 configured to provide an outside in view of the head worn display 32 for the pilot 72 for head tracking. The head tracking unit 18 is computer unit configured to provide head tracking data associated with the cameras 28 and 38 to the interface units 16 and 26. The camera 28 provides a cross cockpit view of the pilot 62 or head worn display 22, and the camera 38 provides a cross cockpit view of the pilot 72 or head worn display 32. The head tracking data associated with the cameras 28 and 38 is provided to the respective units 16 and 26 via a wired connection. The cameras 24 and 28 provide data for a primary head tracking operation for the pilot 62, and the cameras 36 and 38 provide data for a primary head tracking operation for the pilot 72.

The interface units 16 and 26 are in communication with the head worn displays 22 and 32 via WiFi or LiFi connections in some embodiments. The interface unit 16 includes the camera 24 configured to provide an outside in view of the head worn display 22 or the pilot 62 and to provide head tracking data for the pilot 62. The interface unit 16 also includes the camera 76 configured to provide an outside in view across the cockpit of the head worn display 32 or the pilot 72 and to provide head tracking data for the pilot 72. The interface unit 26 includes the camera 36 configured to provide an outside in view of the head worn display 32 or the pilot 72 and configured to provide head tracking data for the pilot 72. The interface unit 26 also includes the camera 78 configured to provide an outside in view across the cockpit of the head worn display 22 or the pilot 62 and to provide head tracking data for the pilot 62. The interface units 26 and 28 are computer units configured to process the video data from the cabinet unit 12 and the head tracking data to provide conformal imagery in the head worn displays 22 and 32. The cameras 24 and 78 provide a primary head tracker for the pilot 62, and the cameras 36 and 76 provide a primary head tracker for the pilot 72.

Head tracking data from the camera 42 is provided to the interface unit 16 via a wireless communication link in some embodiments. Head tracking data from the camera 52 is provided to the interface unit 26 via a wireless communication link in some embodiments. The head worn displays 22 and 32 are configured to provide respective head tracking data using respective markers 43 and 53 fixed in a known location. The head mounted view of cameras 42 and 52 provides data for additional integrity in the head tracking operation.

The head tracking data associated with the cameras 78 and 28 is provided to the interface unit 16, and the head tracking data associated with the cameras 76 and 38 is provided to the interface unit 26. The interface unit 16 processes the head tracking data from the cameras 24, 28, 78, and 42 to determine the head pose (e.g., yaw, pitch, and roll) of the pilot 62 and uses the head position for the provision of an image conformally on the combiner 44. The interface unit 26 processes the head tracking data from the cameras 36, 38, 76, and 52 to determine the head pose (e.g., yaw, pitch, and roll) of the pilot 72 and uses the head position for the provision of an image conformally on the combiner 54. The interface units 16 and 26 can each receive all of the head tracking data and calculate the head pose for both pilots 62 and 72 to provide a redundant calculation of head pose for integrity checks and in case of a subsystem failure in some embodiments. In some embodiments, the interface units 16 and 26 provide the redundant calculations using only the data from the cameras 24, 28, 38, 36, 76 and 78 (without the data from the cameras 42 and 32).

Figure 5:
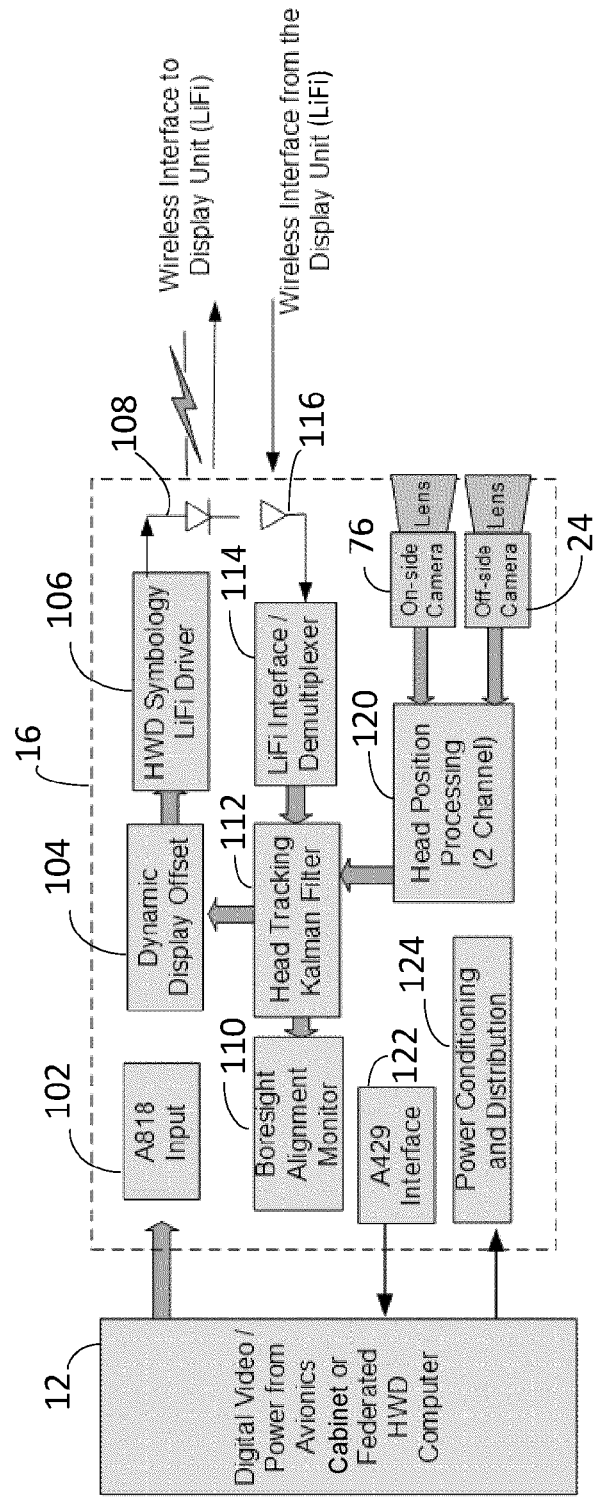
FIG. 5 is a block diagram of an interface unit for the head worn displays of the display systems illustrated in FIGS. 1-4 coupled to a cabinet unit according to certain inventive concepts disclosed herein.

With reference to FIG. 5, the interface unit 16 includes an input 102, a dynamic display offset module 104, a head worn display symbology driver 106, a communication interface 114, a boresight alignment monitor 110, a head tracking Kalman filter 112, an interface 122, a power conditioning and distribution circuit 124, a head pose processing module 120 and the cameras 76 and 26. The interface unit 16 is in wireless communication with the head worn display 22 via the driver 106 and the communication interface 114. The driver 106 and the communication interface 114 are respectively coupled to a transmitter 108 and a receiver 116. The transmitter 108 is a light source such as an LED for LiFi communications or is an antenna for RF communications (e.g., WiFi, Bluetooth, etc.). The receiver 116 is a light detector for LiFi communications or is an antenna for RF communications. The interface unit 16 (FIGS. 2-4) is similar to the interface unit 26 described with reference to FIG. 5 in some embodiments.

The interface unit 16 is coupled by a wired or cabled connection to the cabinet unit 12 via the interface 122, the input 102, and the power conditioning and distribution circuit 124. The input 102 is a video interface for high bandwidth, low latency, and uncompressed digital video transmission in some embodiments. In some embodiments, the input 102 is an ARINC 818 interface. The interface 122 is a self-clocking, self-synchronizing data bus with separate transmit and receive ports using twisted pair wires carrying balanced differential signals in some embodiments. The interface 122 is an ARINC 429 bus interface in some embodiments.

The head pose processing module 120 is a software routine executed on a processor for determining head pose in response to the head tracking data. The head tracking data is provided by cameras 24 and 38 (FIG. 4), by cameras 24 and 78 (FIG. 3), or by cameras 24, 28, and 78 (FIG. 5). The cameras 24, 28 and 78 provide the data through the interface 122 or through a direct bus. The head pose processing module 120 also receives head pose data derived from the camera 42 via the communication interface 114. The interface 114 is a demultiplexer/LiFi interface in some embodiments. Various algorithms can be utilized to determine sensed pose in response to video from one or more of the cameras 24, 28, and 78.

The head pose is provided to the head tracking Kalman filter 112 which provides a filtered head pose to correct for head motion across video frames. The head tracking Kalman filter 112 can provide predictive tracking for higher resolution head tracking in some embodiments. The head pose is adjusted with respect to the boresight by the boresight alignment monitor 110. The adjusted head pose is provided to the dynamic display offset module 104 which adjusts the display image in accordance with the adjusted head pose. The data for the display image is provided to the head worn display symbology driver 106 which provides the data to the transmitter 108 for reception by the head worn display 22.

Figure 6:
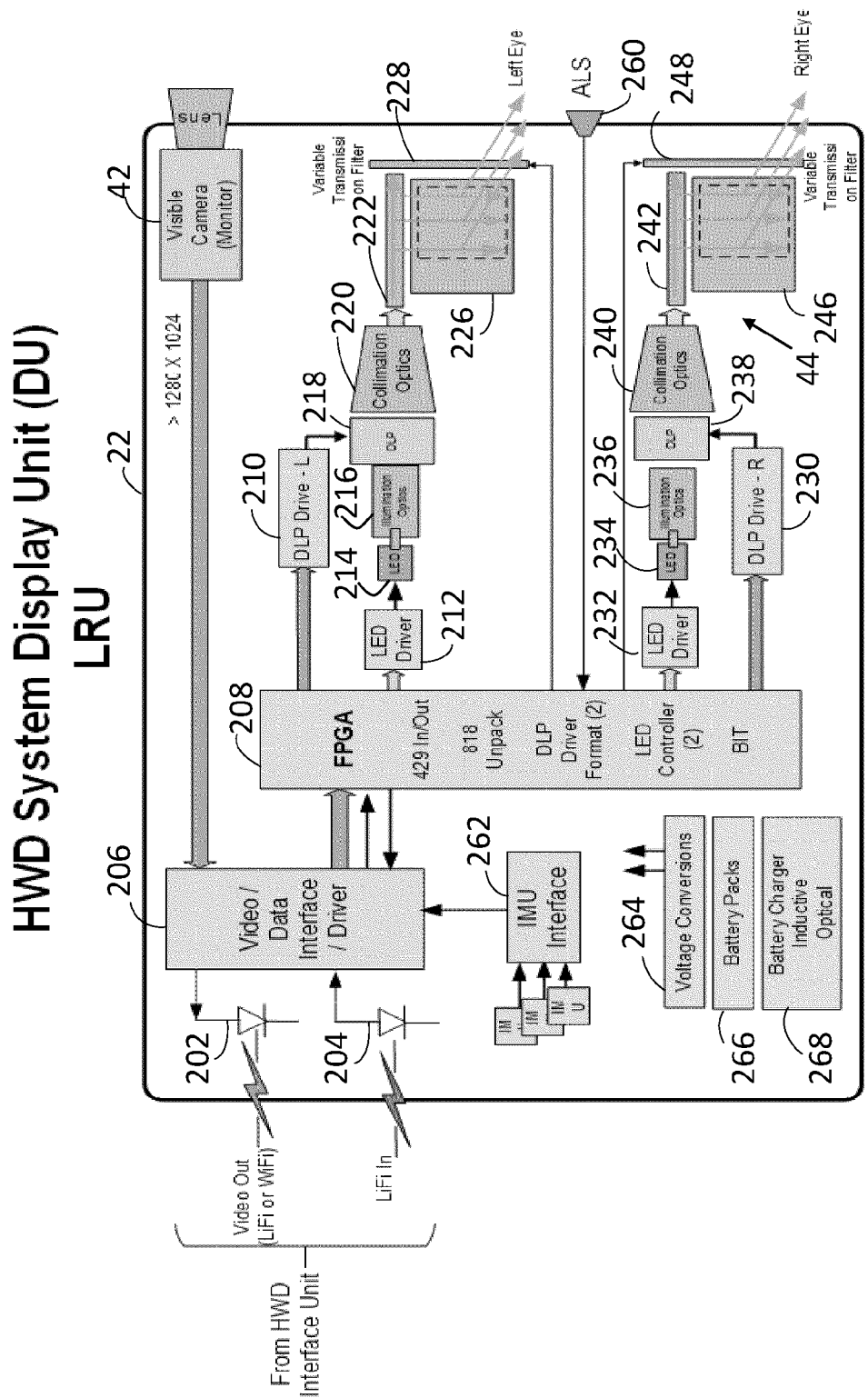
FIG. 6 is a block diagram of a head worn display for the display systems illustrated in FIGS. 1-4 according to certain inventive concepts disclosed herein.

With reference to FIG. 6, the head worn display 22 includes a transmitter 202 similar to the transmitter 108 (FIG. 4), a receiver 204 similar to the receiver 116 (FIG. 4), a wireless interface 206, a processor 208, a left eye image source driver 210, an LED driver 212, an LED 214, an image source 218, illumination optics 216, collimation optics 220, a waveguide 224, a combiner 226, and a variable transmission filter 228. The head worn display also includes a right eye image source driver 230, an LED driver 232, an LED 234, an image source 238, illumination optics 236, collimation optics 240, a waveguide 244, a combiner 246, and a variable transmission filter 248. The image sources 218 and 238 are digital light processors (DLPs), liquid crystal displays, organic light emitting diodes (OLED) panels, or other displays in some embodiments. The head worn display 22

(FIGS. 2-4) is similar to the head worn display 22 described with reference to FIG. 4 in some embodiments.

The transmitter 202 and the receiver 204 are configured to provide a wireless communication link between the interface unit 16 and the head worn display 22. The transmitter 202 and the receiver 204 can receive video data for the image provided on the head worn display 22 and provide video data associated with the head pose provided by the camera 42. In some embodiments, the wireless communication link is an optical communication link (e.g. LiFi link) for encoded data in the form of pulses of light sent by transmitters 108 (FIG. 4) and 202. The transmitter 108 is embodied as one or more emitters fixed in and around the instrument panel or using emission arrays, and the transmitter 202 is embodied as one or more emitters fixed in and around the head worn display 22 in some embodiments. The receiver 116 (FIG. 4) and the receiver 204 are in the form of photo-diodes filtered for a specific transmission band or in the form of imaging sensors that can be used to receive data from a transmitting array in some embodiments. The specific transmission band is outside of the visible spectrum in some embodiments. In some embodiments, signal training and lock can be accomplished on the receiving head worn display (e.g., the head worn display 22). In some embodiments, a hardware switch can be used to reset (re-train) the communication path(s) if a lock on encrypted information is lost. Training can also use an array of pattern reference targets or synchronization information sent periodically from the emitter(s) in some embodiments.

The head worn display 22 also includes an ambient light sensor 260, an interface 262, battery packs 266 and a battery charger 268. The light sensor senses ambient light and provides a signal to the processor 208 so that the processor can adjust brightness and/or contrast for ambient light conditions. The processor 208 is a field programmable gate array, a digital signal processor or a controller configured for the operations described herein. The battery charger 268 includes an inductive charger which provides charging in response to RF signals in the cockpit environment (e.g., from the interface unit 16). In some embodiments, the battery charger 268 includes an inductive charger for charging the battery packs 266 when the head worn display 22 is placed in a storage cradle or a protective container located in the flight deck.

The battery charger 268 includes a light charging panel or detector which provides charging in response to LiFi signals or other light in the cockpit environment (e.g., infrared or ultraviolet light from the interface unit 16 or from the transmitter 108) in some embodiments.

The processor 208 responds to the data provided by the interface unit 16 and drives the image sources 218 and 238 through drivers 210 and 230 to provide the appropriate images to the combiners 226 and 246. The left eye image source driver 210, the LED driver 212, the LED 214, the image source 218, the illumination optics 216, the collimation optics 220, the waveguide 224, and the combiner 226 provide a left eye projector combiner system. The right eye image source driver 230, the LED driver 232, the LED 234, the image source 238, the illumination optics 236, the collimation optics 240, the waveguide 244, the combiner 246, and the variable transmission filter 248 provide a right eye projector combiner system.

In some embodiments, the image sources 218 and 238 are liquid crystal displays (LCDs) with LED array backlights which are independently controlled within the backlight. The near-UV content in white LEDs or separate or near-IR content in red LEDs can be used to send information to the head worn display 22 at speeds not visually noticeable to the pilot 62. The backlight array can be used both as an augmented reality (AR) transmitter and a location reference for the augmented reality overlay. This can be especially useful when the head worn display 22 is used to highlight priority information on the primary flight display (PFD). In some embodiments, for very high-speed, wide-path data transfer, a dedicated optical array can be installed in the cockpit, potentially in redundant locations, to communicate information to the head worn display 22. In some embodiments, a fast-switching micro-electro-mechanical display may provide a "Signal Lock" message to the pilot 72 but is actually transmitting rapidly-changing data to an equally-fast helmet-mounted camera (e.g., the camera 42). The pilot 72 may determine if the system 101 is functioning by testing whether the display provides a "Signal Lock" or "No Lock" message when the pilot's head is turned which provides superior detection than determining a presence or absence of light.

In some embodiments, a transmitting array (e.g., transmitter 108) may also be placed in the seat-back to transmit, from a much closer range, wireless data to the head worn display 22. Optical image recognition implemented in either or both the aircraft 5 and 55 (FIGS. 1A-B) and on the pilot 72 is capable of discerning the pilot's exact location and orientation. Near visible communication frequencies leverage low-cost components and provide higher resolution compared to longer wavelength communications.

The interface 262 provides a wired connection to head mounted internal measurement units of head worn display 22 for receiving inertial, angular and translational measurements of the head. display 22. The variable transmission filters 228 and 248 are controlled by the processor 208. The variable transmission filters 228 and 248 are configured to adjust transmission through the combiners 226 and 246. The drivers 210 and 230 are DLP drive circuits in some embodiments. The combiners 226 and 246 can be any type of combiner including but not limited to: wave guide combiners, holographic combiners, half-silvered mirrors, reflective combiners, etc. In some embodiments, the combiners 226 and 246 are a single combiner (e.g., monocular) or a single near eye combiner for viewing with both eyes.

The illumination optics 216 and 236 and the collimation optics 220 and 240 can be combinations of any optical components for projecting light using the image sources 218 and 238 and projecting collimating light through waveguides 222 and 242 to the combiners 226 and 246. Beam splitters, lenses, prisms, mirrors, and other optical components can be utilized. The waveguides 222 and 224 and the combiners 226 and 246 can be plastic waveguides including diffraction gratings for injecting and ejecting images. The images can include information relating to the aircraft's position, speed, altitude, and heading, weather information, terrain information, or HUD symbols. The display information may include aircraft-referenced imagery (e.g., a target indicator for a weapons system that indicates the position of a target with reference to the aircraft 5). The display information may include earth-referenced imagery (e.g., objects of interest based on the object's known location on earth, such as a runway).

The circuits of the head worn display 22 and the circuits of the interface unit 16 may be implemented as a specific purpose processor, an application specific integrated circuit (ASIC), one or more field programmable gate arrays (FPGAs), a group of processing components, or other suitable electronic processing components. The memory (e.g., RAM, ROM, flash memory, hard disk storage) for storing data and computer code for completing and facilitating the various user or client processes, layers, and modules described in the present disclosure may be included in the circuits of the head worn display 22 and the interface unit 16. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more operations described herein.

As will be appreciated from the above, systems and methods for providing imagery for display on a head worn display system according to embodiments of the inventive concepts disclosed herein may reduce electric power and computational power needed to operate typical head worn display systems by processing imagery remote from the head worn displays 22 and 32, thereby reducing hardware requirements.

Figure 7:
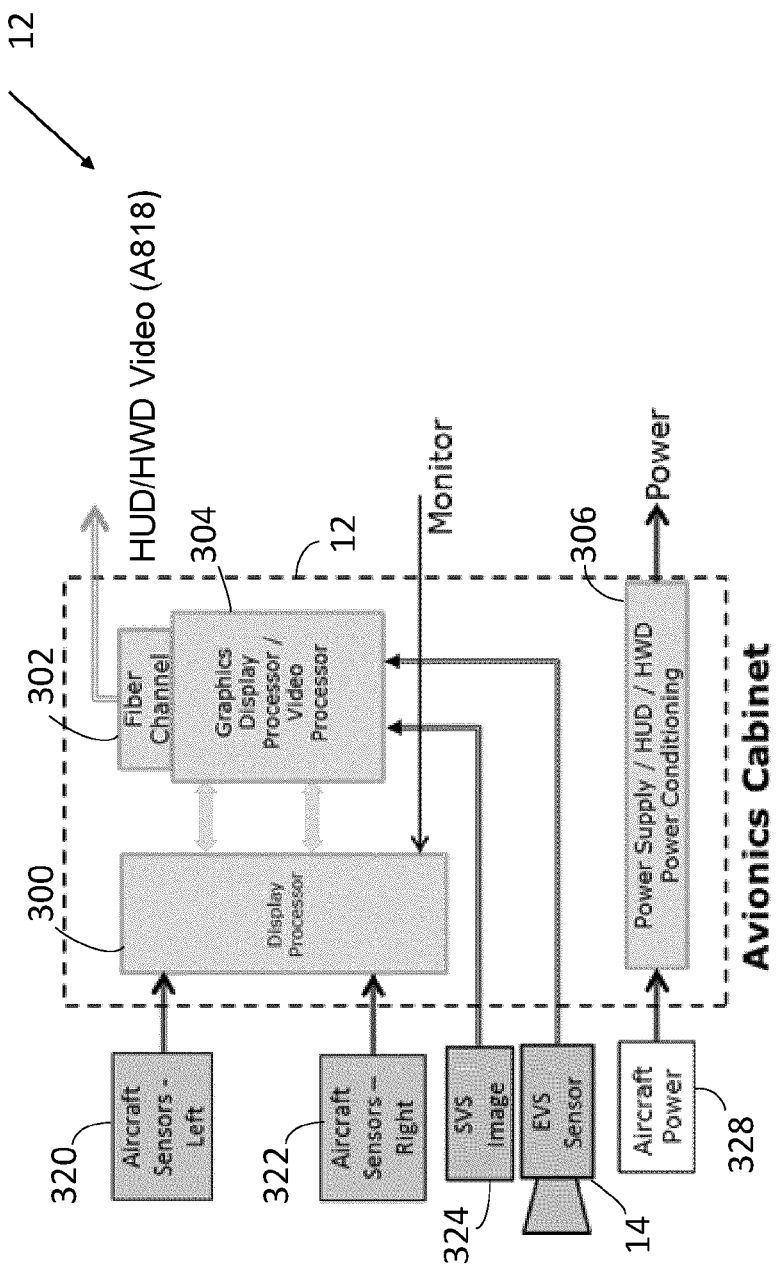
FIG. 7 is a block diagram of the cabinet unit illustrated in FIG. 5 according to certain inventive concepts disclosed herein.

With reference to FIG. 7, the cabinet unit 12 includes the dual channel processor 13 which is coupled to the enhanced vision system 14, left aircraft sensors 320, right aircraft sensors 322, and aircraft power 328. The dual channel processor 13 includes a display processor 300, fiber channel 302, a graphics processor 304, and a power supply 306. The power supply 306 provides power conditioning for the interface units 16 and 26 and is powered by the aircraft power 328. The display processor 300 provides graphic rendering instructions to the graphics processor. The graphics processor 304 renders the graphics, receives a synthetic vision system image and video for the enhanced vision system 14, and merges these images. The fiber channel 302 is used to provide the merged image from the graphics processor 304 to the interface units 16 and 26 in some embodiments.

Figure 8:
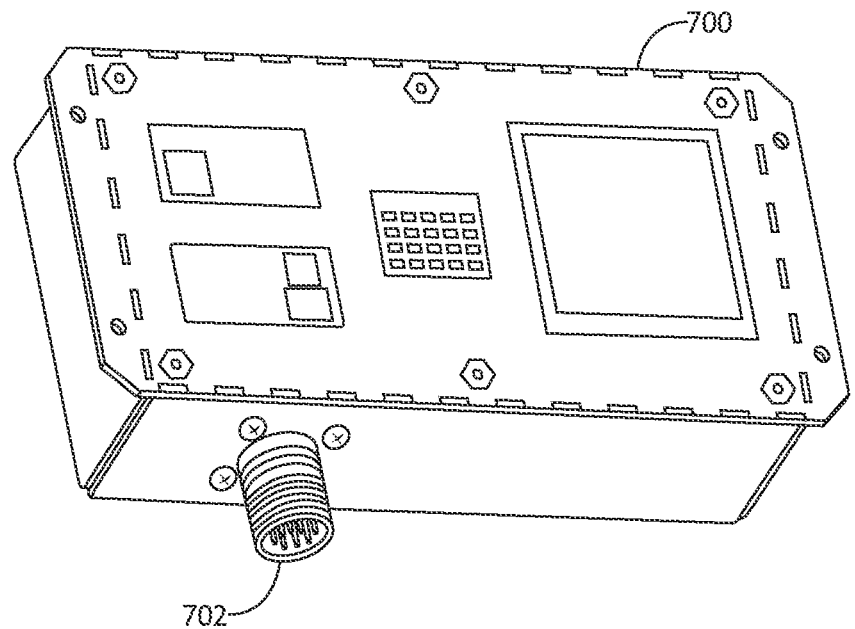
FIG. 8 is a perspective view schematic illustration of an exemplary embodiment of the interface unit illustrated in FIG. 5 according to certain inventive concepts disclosed herein.
Figure 9:
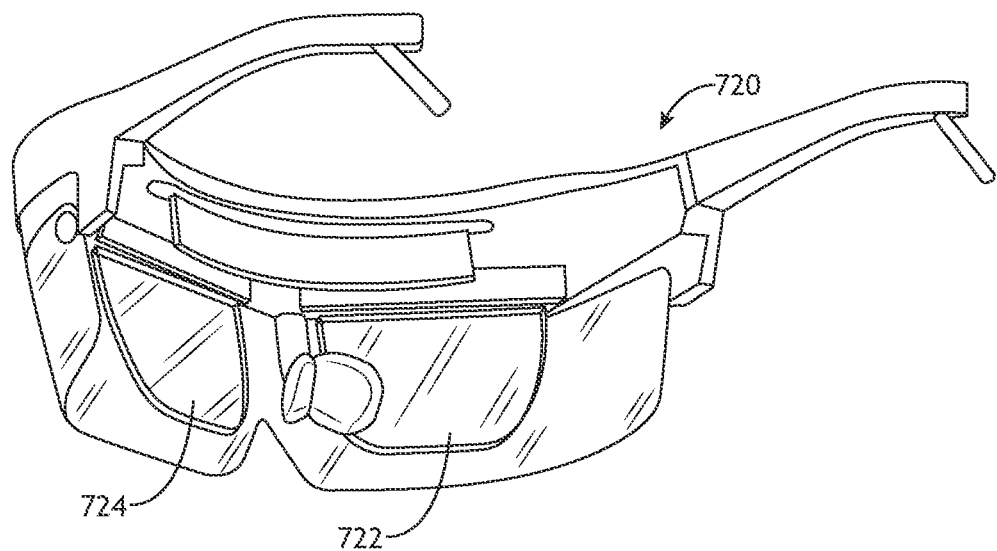
FIG. 9 is a perspective view schematic illustration of an exemplary embodiment of the head worn display illustrated in FIG. 6 according to certain inventive concepts disclosed herein.

With reference to FIG. 8, an interface housing 700 for the interface unit 26 includes a network connector 702. With reference to FIG. 9, a head worn display 720 can be used as head worn display 22 is configured in a glasses form. The head worn display 720 includes combiner lenses 722 and 724 which are similar to the combiners 226 and 246 (FIG. 6).

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head worn display, comprising:
    a communication interface having a light transmitter and a light receiver;
    an eye tracking system configured to determine the orientation of the eyes of a user, wherein the communication interface transmits eye orientation data via the light transmitter;
    a projector configured to project an image associated with video data received by the light receiver based at least in part on eye orientation data;
    an ambient light sensor for sensing ambient light for adjusting at least one of brightness or contrast for ambient light conditions; and
    a combiner configured to display the image, wherein the light transmitter is provided with a backlight assembly associated with the projector.

2. The head worn display, of claim 1, wherein the light transmitter comprises at least one visible light emitting diode configured to provide backlighting for the projector.

3. The head worn display, of claim 1, wherein the light transmitter comprises at least one visible light emitting diode.

4. The head worn display of claim 1, wherein the eye tracking system is a head tracker for determining head pose and configured to generate head tracking data.

5. The head worn display of claim 1, wherein said communication interface further comprises at least a first and second display input and the combiner is configured to combine inputs to generate imagery representing an actual view, a synthetic view, or a combination view.

6. The head worn display, of claim 4, wherein the head tracking data is communicated through the combiner.

7. The head worn display of claim 1, wherein the interface unit includes a camera configured to provide an outside view.

8. The head worn display of claim 7, wherein the interface unit camera is configured to provide head tracking data.

9. The head worn display of claim 8, wherein the head tracking data provides redundant head pose data.

10. The head worn display of claim 1, wherein the interface unit includes a power conditioning and distribution circuit.

11. The head worn display of claim 1, wherein the receiver is coupled to a transmitter and receiver.

12. The head worn display of claim 11, wherein the interface unit is a self-clocking and self-synchronizing data bus.

13. The head worn display of claim 11, wherein the interface unit is a demultiplexer interface.

14. The head worn display of claim 1, further comprises a processor, a left eye image source driver including an LED driver, an LED, an image source, illumination optics, collimation optics, a waveguide, a combiner, and a variable transmission filter.

15. The head worn display of claim 14, further comprises a right eye image source driver including an LED driver, an LED, an image source, illumination optics, collimation optics, a waveguide, a combiner, and a variable transmission filter.

16. The head worn display of claim 15, wherein the image sources are at least one of a display selected from the group including a digital light processors (DLPs), a liquid crystal displays, or a organic light emitting diodes (OLED) panel.

17. The head worn display of claim 1, further comprising a battery.

18. The head worn display of claim 17, further comprising an inductive battery charger for charging said battery.

19. The head worn display of claim 17, wherein the battery charger includes at least one of a light charging panel or detector for providing charging in response to LiFi signals or ambient light including infrared or ultraviolet light from the interface unit.

20. The head worn display of claim 1, wherein the combiner is at least one selected from the group including wave guide combiners, holographic combiners, half-silvered mirrors, or reflective combiners and the combiners are selected from the group including at least one of a single combiner or a single near eye combiner for viewing with both eyes.

\* \* \* \* \*